United States Patent
Baranczyk et al.

(10) Patent No.: US 10,534,790 B2
(45) Date of Patent: Jan. 14, 2020

(54) DYNAMIC AND PREDICTIVE GLOBAL TEMPORARY TABLES

(71) Applicant: International Business Machines Corporation, Armonk, NY (US)

(72) Inventors: Shawn J. Baranczyk, Rochester, MN (US); Rafal P. Konik, Oronoco, MN (US); Roger A. Mittelstadt, Byron, MN (US); Brian R. Muras, Otsego, MN (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 15/298,500

(22) Filed: Oct. 20, 2016

(65) Prior Publication Data

US 2018/0113921 A1 Apr. 26, 2018

(51) Int. Cl.
*G06F 16/25* (2019.01)
*G06F 16/22* (2019.01)

(52) U.S. Cl.
CPC .......... *G06F 16/258* (2019.01); *G06F 16/221* (2019.01); *G06F 16/25* (2019.01)

(58) Field of Classification Search
CPC ......... G06F 17/30569; G06F 17/30315; G06F 17/30557; G06F 16/221; G06F 16/258; G06F 16/25
See application file for complete search history.

(56) References Cited

U.S. PATENT DOCUMENTS

| | | | |
|---|---|---|---|
| 6,785,673 B1 * | 8/2004 | Fernandez | G06F 17/2247 |
| 6,795,868 B1 * | 9/2004 | Dingman | G06F 17/30569 |
| | | | 707/999.202 |
| 7,774,372 B2 | 8/2010 | Croisettier et al. | |
| 8,930,397 B2 | 1/2015 | Rambo et al. | |
| 2005/0256907 A1 * | 11/2005 | Novik | G06F 16/1787 |
| 2006/0085465 A1 * | 4/2006 | Nori | G06F 17/30297 |
| 2014/0222872 A1 * | 8/2014 | Rambo | G06F 17/30345 |
| | | | 707/803 |
| 2014/0279837 A1 * | 9/2014 | Guo | G06F 17/30589 |
| | | | 707/603 |
| 2015/0088811 A1 * | 3/2015 | Hase | G06F 16/283 |
| | | | 707/607 |
| 2015/0088830 A1 * | 3/2015 | Kamp | G06F 11/2058 |
| | | | 707/648 |

FOREIGN PATENT DOCUMENTS

| | | |
|---|---|---|
| CN | 101178724 A | 5/2008 |
| CN | 101178724 B | 5/2011 |
| CN | 101739447 B | 11/2012 |

OTHER PUBLICATIONS

McDonald, C., "Waste Not, Want Not", Oracle Insights: Tales of the Oak Table, Apress, 2004, pp. 97-140.

* cited by examiner

*Primary Examiner* — Kris E Mackes
*Assistant Examiner* — Lin Lin M Htay
(74) *Attorney, Agent, or Firm* — Patterson + Sheridan, LLP (57) ABSTRACT

Systems, methods, and computer program products to perform an operation comprising receiving, by a database management system (DBMS) from an application, a request specifying to generate a global temporary table (GTT) of a first format, identifying a first GTT, of a plurality of GTTs stored by the DBMS, that has a second format, different than the first format, modifying the first GTT such that at least a portion of the modified first GTT is of the first format, and providing the modified first GTT to the application.

20 Claims, 6 Drawing Sheets

FIG. 1

GLOBAL TEMPORARY TABLE 104 - SESSION1.temp

COL1 201

CHAR (1024)

FIG. 2A

GLOBAL TEMPORARY TABLE 104

| EMPNO CHAR(6) | SALARY DECIMAL(9, 2) | UNUSED PORTION |
|---|---|---|
|  |  |  |
|  |  |  |
| ... | ... |  |
|  |  |  |

DYNAMIC AND PREDICTIVE GLOBAL TEMPORARY TABLES

BACKGROUND

The present invention relates to computer databases, and more specifically, to computer databases which provide dynamic and predictive global temporary tables.

Often, applications that access database data use some form of temporary data store for complex processes. One example of such a temporary data store is a global temporary table. Recently, the overall use of global temporary tables has increased. As such, it is important that system performance when using global temporary tables is as fast as possible. However, the creation of global temporary tables is expensive from a performance point of view, as system resources are used each time a global temporary table is created.

SUMMARY

According to one embodiment, a method comprises receiving, by a database management system (DBMS) from an application, a request to generate a global temporary table (GTT) of a first format, identifying a first GTT, of a plurality of GTTs stored by the DBMS, that has a second format, different than the first format, modifying the first GTT such that at least a portion of the modified first GTT is of the first format, and providing the modified first GTT to the application.

According to another embodiment, a system comprises one or more computer processors and a memory containing a program which when executed by the processors performs an operation comprising receiving, by a database management system (DBMS) from an application, a request to generate a global temporary table (GTT) of a first format, identifying a first GTT, of a plurality of GTTs stored by the DBMS, that has a second format, different than the first format, modifying the first GTT such that at least a portion of the modified first GTT is of the first format, and providing the modified first GTT to the application.

In another embodiment, a computer-readable storage medium has computer-readable program code embodied therewith, the computer-readable program code executable by a processor to perform an operation comprising receiving, by a database management system (DBMS) from an application, a request to generate a global temporary table (GTT) of a first format, identifying a first GTT, of a plurality of GTTs stored by the DBMS, that has a second format, different than the first format, modifying the first GTT such that at least a portion of the modified first GTT is of the first format, and providing the modified first GTT to the application.

DETAILED DESCRIPTION

Embodiments disclosed herein provide techniques to improve system performance when database management systems and associated applications use global temporary tables. Specifically, embodiments disclosed herein provide a pool of global temporary tables that can be used any time an application issues a statement to create a global temporary table. The global temporary tables stored in the pool may be of varying formats. The formats may be predetermined based on a learning engine which predicts the best formats to use for the global temporary tables in the pool. However, the global temporary tables in the pool contain generic definitions that can be used by most tables by casting pieces of the columns to match the definitions requested by the applications.

By re-casting columns from an existing global temporary table from the pool, embodiments disclosed herein improve the performance of applications and database management systems by not creating a new global temporary table each time an application attempts to create one.

Figure 1:
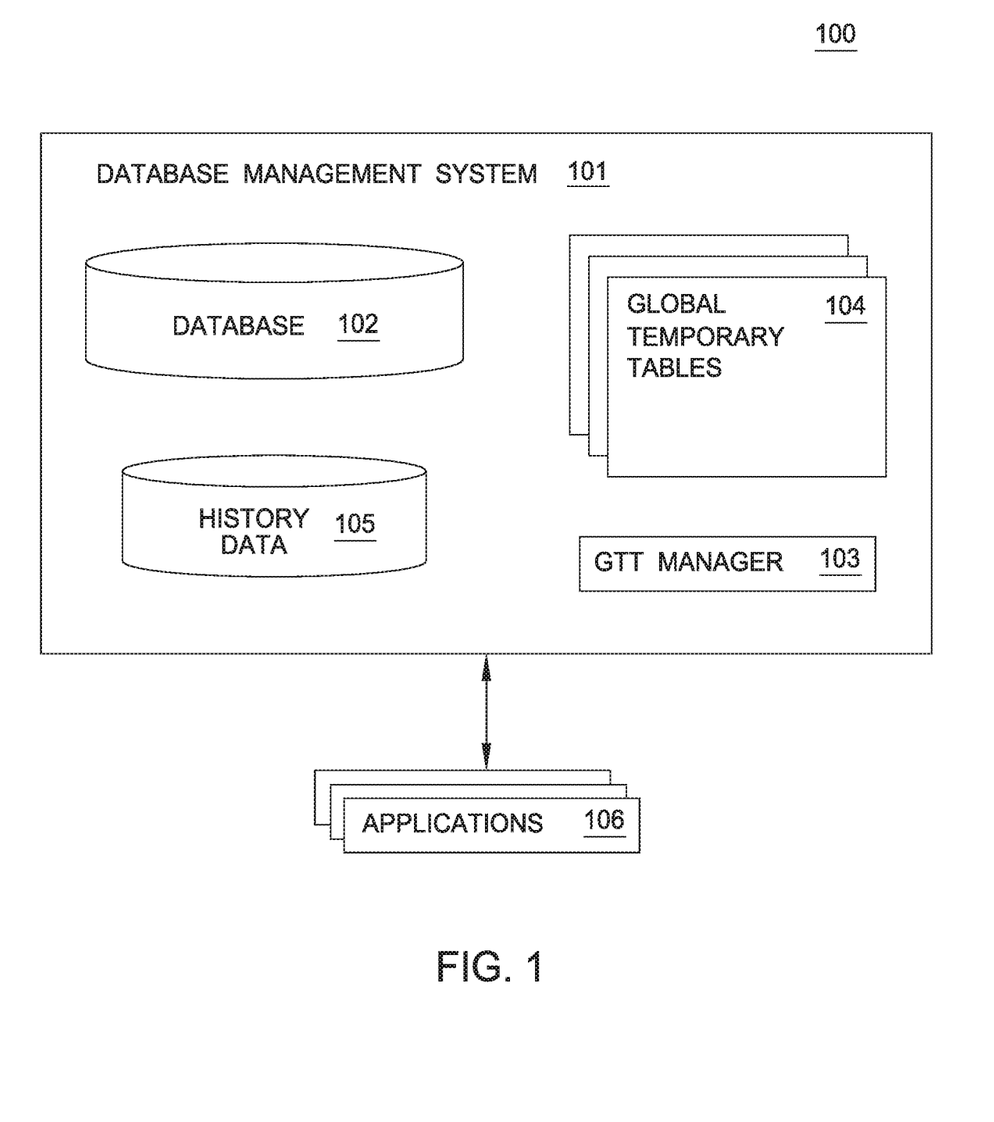
FIG. 1 illustrates an example system architecture to provide dynamic and predictive global temporary tables, according to one embodiment.

FIG. 1 illustrates an example system architecture 100 to provide dynamic and predictive global temporary tables, according to one embodiment. As shown, the system 100 includes a database management system (DBMS) 101 and one or more applications 106. Generally, a DBMS is generally configured to create, maintain, and manage databases, such as the database 102. As shown, the DBMS 101 includes the database 102, global temporary table (GTT) manager 103, one or more global temporary tables 104, and a history data 105. The database 102 is an organized collection of data. The GTTs 104 are temporary data structures (e.g., database tables) that are used by the applications 106 to process complex or complicated tasks, such as queries that return large data sets. The data stored in the GTTs 104 by applications 106 are private, such that data inserted by a given application 106 can only be accessed by that application (or another application that is part of the same job as the given application 106). Generally, the applications 106, may access, create, or modify data in the database 102 via the DBMS 101 (e.g., via query statements). The applications 106 are representative of any type of application which accesses database data.

The GTT manager 103 is a component of the DBMS 101 configured to create and manage the pool of GTTs 104. The GTTs 104 created by the GTT manager 103 need not exactly match the GTT formats requested by the applications 106. Instead, the GTT manager 103 creates GTTs 104 that have generic definitions that can be used by the applications 106 by casting pieces of the columns of the GTTs 104 to match the GTT definitions requested by the applications 106. For example, a first GTT 104 may have a single column that is defined as CHAR(1024). An application 106 may specify to create a GTT having a single column with a definition of CHAR(512). In response, the GTT manager 103 may cast the requested CHAR(512) column onto the CHAR(1024)

column of the first GTT 104, and provide the first GTT 104 to the application 106, which uses the first GTT 104 without being aware of the casted format, and without the GTT manager 103 having to waste system resources to create the requested GTT with the CHAR(512) column. Generally, casting converts a database column from a first format to a second, requested format, e.g., float to integer.

The GTT manager 103 is further configured as a learning engine. Specifically, the GTT manager 103 learns which GTT formats are most likely to be requested by the applications 106, and anticipates the GTT table 104 and/or format creation ahead of time. To this end, the history data 105 is a data store managed by the GTT manager 103, and reflects prior use patterns of GTTs 104 by the applications 106. For example, whenever an application 106 requests to create a GTT 104, the GTT manager 103 may store an indication of the requested format of the GTT 104. By doing so, the GTT manager 103 is able to determine, over time, the most frequently requested GTT formats by one or more of the applications 106. Using the history data 105, the GTT manager 103 is able to create GTTs 104 that have formats matching the most frequently requested GTT formats by one or more of the applications 106. In addition, the GTT manager 103 may scan the source code of the applications 106 to identify statements in the source code that create GTTs. The GTT manager 103 may identify the GTT formats specified in such statements, and store an indication of the specified GTT formats in the history data 105. Doing so allows the GTT manager 103 to further tailor the formats of the GTTs 104 to one or more applications 106 before those one or more applications 106 have even requested a particular GTT. Further still, the GTT manager 103 is configured to analyze query access plans generated by the DBMS 101 responsive to receiving queries by the applications 106. If these query access plans specify to create GTTs 104, the GTT manager 103 may identify the requested GTT formats, and store an indication of the requested GTT formats in the history data 105. As such, the GTT manager 103 can further consider these requested formats when creating the pool of GTTs 104.

Generally, therefore, at some predetermined time (e.g., at system startup, or at periodic timing intervals thereafter), the GTT manager 103 may create the pool of GTTs 104. The GTTs in the pool of GTTs 104 may be of one or more formats, where the formats are determined by the GTT manager 103 based on the history data 105 (e.g., the formats most likely to facilitate requests for GTTs by the applications 106). Thereafter, the GTT manager 103 may receive a request to create a GTT by one or more of the applications 106. The GTT manager 103 may then identify the format specified in the request, and determine whether a matching GTT exists in the pool of GTTs 104. If a match exists, the GTT manager 103 provides the matching GTT 104 to the application 106, and marks the provided GTT 104 as used (so that it is not allocated to other applications). If a match does not exist, the GTT manager 103 identifies the closest matching GTT 104 (e.g., a GTT 104 that has enough storage capacity and can accommodate the requested data types), and provides the identified GTT 105 to the application 106. Regardless of the GTT 104 provided to the application 106, once the application 106 finishes using the GTT 104, the GTT manager 103 may mark the GTT 104 as free and return the GTT 104 to the pool of GTTs 104. If the GTT manager 103 casted the format of the GTT 104 (e.g., a matching GTT 104 was not found), the GTT manager 103 may delete the modifications that were made to the GTT 104 to cast the format. However, in some embodiments, the GTT manager 103 may retain the modifications if the GTT manager 103 determines the casted GTT 104 may be re-used by the applications 106 at a later time.

Figure 2A:
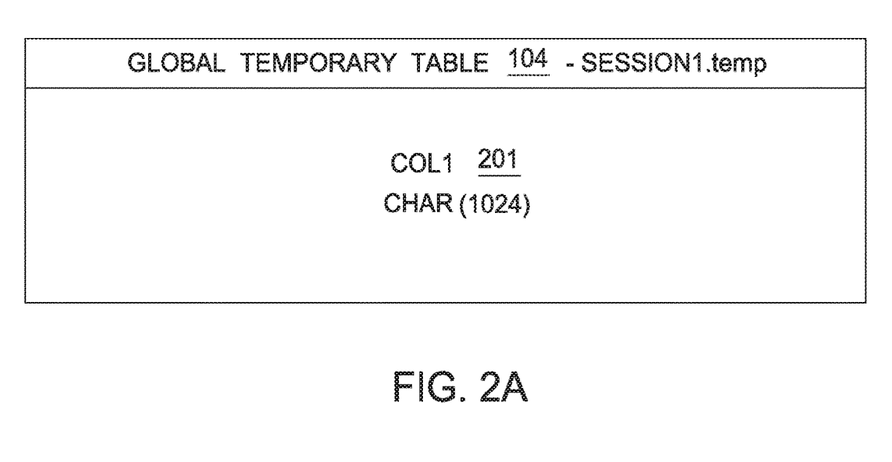
FIGS. 2A-2B illustrate example global temporary tables, according to various embodiments.

FIG. 2A illustrates an example global temporary table 104, according to one embodiment. Generally, the GTT manager 103 creates the GTTs 104 to include a large varchar, a set of varchars, integers, and/or numeric fields. As shown, the example GTT 104 has the example name of "session1.temp," and includes a data portion, COL1 201, which is defined as a CHAR(1024) field. In structured query language (SQL), the GTT 104 may be created by the statement "CREATE TABLE session.temp1 (COL1 (CHAR 1024))". When an application 106 requests to create a GTT, the GTT manager 103 may use the GTT 104 depicted in FIG. 2A rather than generating a new GTT that has the requested format. In at least one embodiment, the GTT manager 103 defines a new format over the GTT 104, e.g., by casting the field requested by the application 106 over the existing format of the GTT 104 (e.g. the CHAR(1024) field).

Figure 2B:
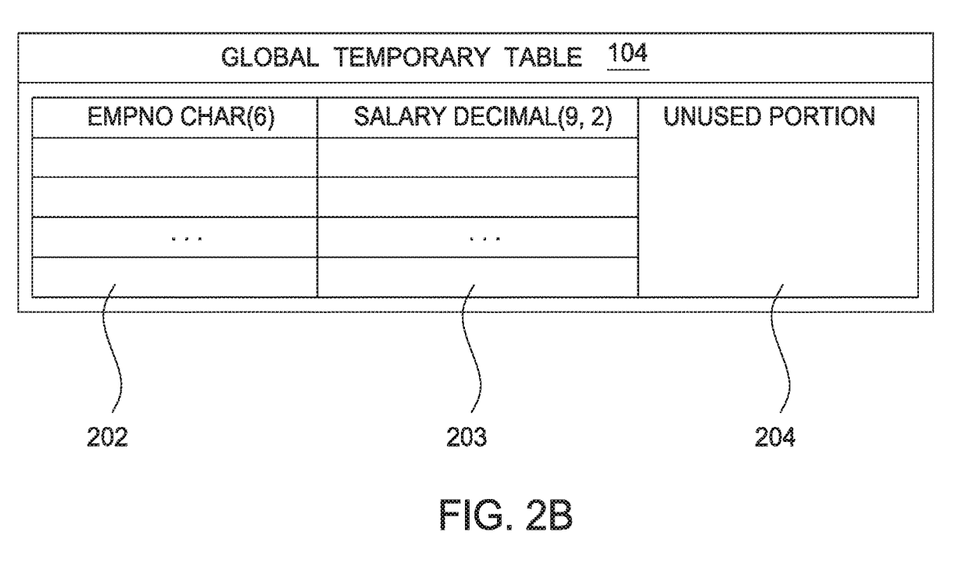

FIG. 2B depicts a result of casting the GTT 104 to match the GTT definition requested by an application 106. For example, an application 106 may request to create a GTT using the following SQL statement: "DECLARE GLOBAL TEMPORARY TABLE SESSION.T1 (EMPNO CHAR(6), SALARY DECIMAL(9, 2))". As shown, the declare statement requests a GTT with the name of "session.t1" that includes two columns, an employee number column (EMPNO) that is 6 characters in length, and a salary column that is a decimal value with 9 possible digits to the left of the decimal point, and 2 possible digits to the right of the decimal point.

Instead of creating a new GTT with the EMPNO and SALARY columns, the GTT manager 103 may re-use the GTT 104 depicted in FIG. 2A. Specifically, the GTT manager 103 may cast these columns onto the existing column COL1 201 of the GTT 104. As shown in FIG. 2B, the GTT 104 now includes a column 202 defined as EMPNO CHAR (6), a column 203 defined as SALARY DECIMAL(9, 2), and an unused portion 204. The GTT manager 103 may mark the unused portion 204 OF COL1 201 as unused to prevent accesses to this unused portion of data.

To cast the EMPNO and SALARY columns to COL1 201 of the GTT 104, the GTT manager 103 may use any number of techniques. For example, the GTT manager 103 may cast the requested columns via the following SQL statement: "CAST(SUBSTRING(COL1, 1, 6) AS CHAR(6)), CAST (SUBSTRING(COL1, 7, 5) AS DECIMAL(9, 2))". As shown, the SQL statement casts a first substring of COL1 as a CHAR(6), and a second substring of COL1 as DECIMAL (9,2), thereby casting the requested columns to COL1.

As another example, the GTT manager 103 may create a structure similar to a database view to redefine the format of the GTT 104 and reuse the GTT 104. Generally, a database view is a virtual database table. In such embodiments, the GTT manager 103 redefines the format of the GTT 104 by creating a view format that can be used. In one embodiment, the view format is created by the following example SQL statement: "create view session.T1 (EMPNO, SALARY) AS select CAST(SUBSTRING(COL1, 1, 6) AS CHAR(6)), CAST(SUBSTRING(COL1, 7, 5) AS DECIMAL(9, 2)) from session.temp1".

Furthermore, in some embodiments, instead of creating a view format to cast the physical layout of the GTT 104, the GTT manager 103 may modify the internal table format which defines the physical layout of the GTT 104. The internal table format includes physical mappings of bits and bytes used by the DBMS 101 to define tables, including the GTTs 104. For example, a first internal table format may define the physical layout of the GTT 104 depicted in FIG. 2A (e.g., a single column, COL1). As such, the GTT manager 103 may overlay the first internal table format with a second internal table format that describes the new format (e.g., the EMPNO and SALARY columns) of the GTT 104.

Regardless of the technique used to modify the GTT 104, the GTT manager 103 then marks the modified GTT 104 as used, and provides the modified GTT 104 to the requesting application 106. The application 106 may then use the modified GTT 104. Once the existing format of the GTT 104 is replaced with the requested format, the modified format of the GTT 104 is used by the DBMS 101 and/or the application 106 (e.g., when insert, update, select operations target the modified GTT 104). Once the application 106 is finished using the modified GTT 104, the GTT manager 103 may mark the modified GTT 104 as available for use. In at least one embodiment, the GTT manager 103 retains the modified GTT 104 if the GTT manager 103 determines that the modified GTT 104 is likely to be re-used by the applications 106. In other embodiments, however, the GTT manager 103 removes the modifications to the GTT 104.

Figure 3:
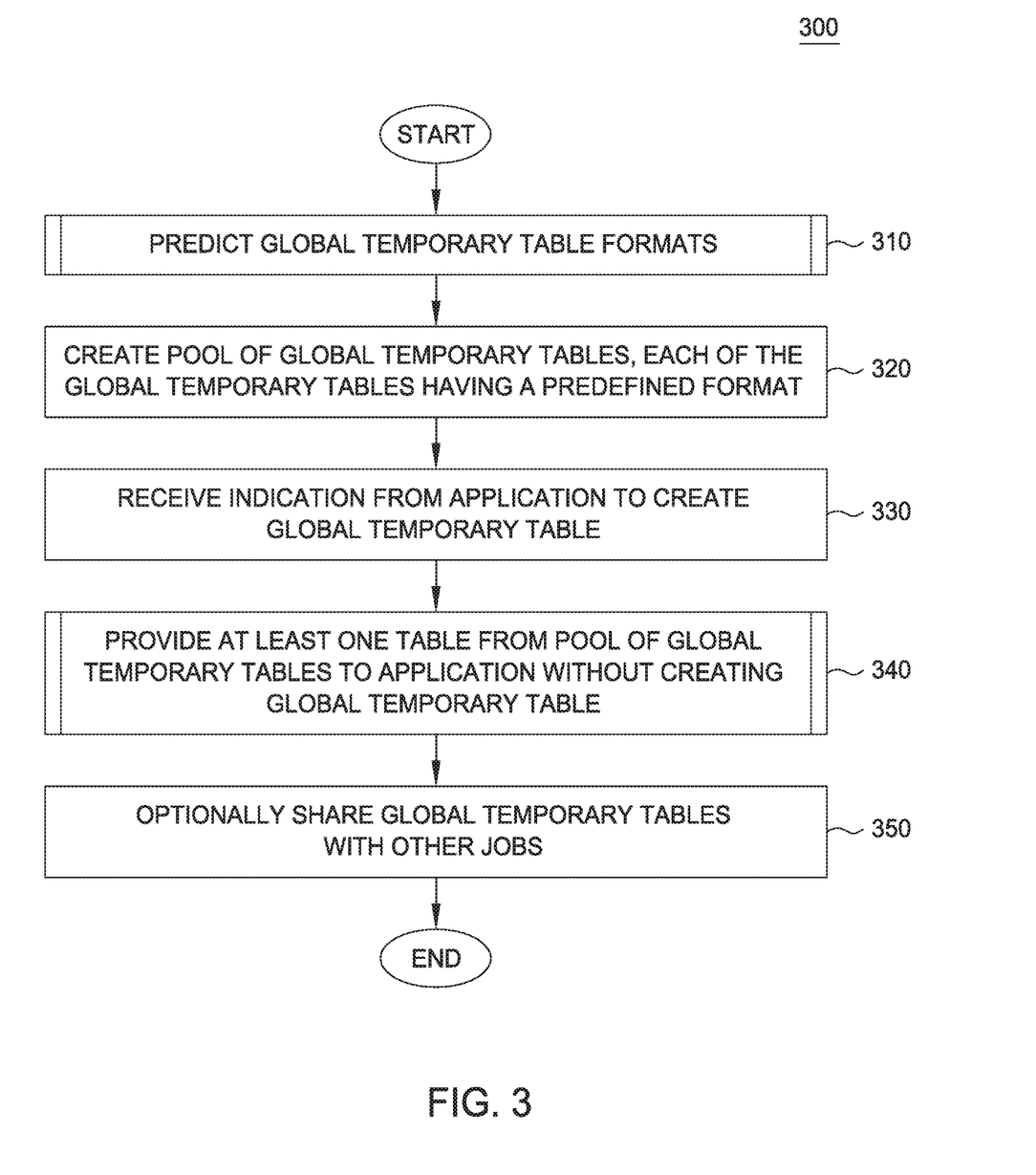
FIG. 3 is a flow chart illustrating a method to provide dynamic and predictive global temporary tables, according to one embodiment.

FIG. 3 is a flow chart illustrating a method 300 to provide dynamic and predictive global temporary table formats, according to one embodiment. As shown, the method 300 begins at block 310, where the GTT manager 103 predicts one or more GTT formats that are likely to be the most versatile formats (e.g., are most likely to be able to be reused). As described in greater detail with reference to FIG. 4, the GTT manager 103 may generally determine the GTT formats based on one or more of the history data 105, scanning the source code of the applications 106, and query access plans generated by the DBMS 101.

At block 320, the GTT manager 103 creates the pool of GTTs 104, where each of the GTTs in the GTTs 104 has a predefined format. At least one of the predefined formats may be based on the predicted formats determined at block 310. Generally, the GTTs in the GTTs 104 include generic definitions that can be used by most requested GTT table formats by casting pieces of the columns to match the requested formats. In at least one embodiment, the GTT manager 103 creates the pool of GTTs 104 before the applications 106 begin executing. However, the GTT manager 103 may create the pool of GTTs 104 at any point, may periodically update the pool of GTTs 104, which may include different predefined formats if the history data 105, application code, and query access plans indicate that other predefined formats are more desirable. At block 330, the GTT manager 103 receives an indication to create a global temporary table from one of the applications 106.

At block 340, described in greater detail with reference to FIG. 5, the GTT manager 103 provides at least one GTT from the pool of GTTs 104 to the requesting application 106. By re-using the GTT from the pool of GTTs 104, the GTT manager 103 provides the GTT without having to waste system resources to create the requested GTT. At block 350, the GTT manager 103 may share the global temporary tables created at block 310 with other jobs. In at least one embodiment, the GTT manager 103 designates at least a subset of the GTTs 104 for a particular job (which may include a plurality of applications). However, in some embodiments, the GTT manager 103 may share the GTTs 104 created at block 320 with other jobs (e.g., when the jobs include similar applications, have history data 105 indicating similar requested GTT formats, etc.).

Figure 4:
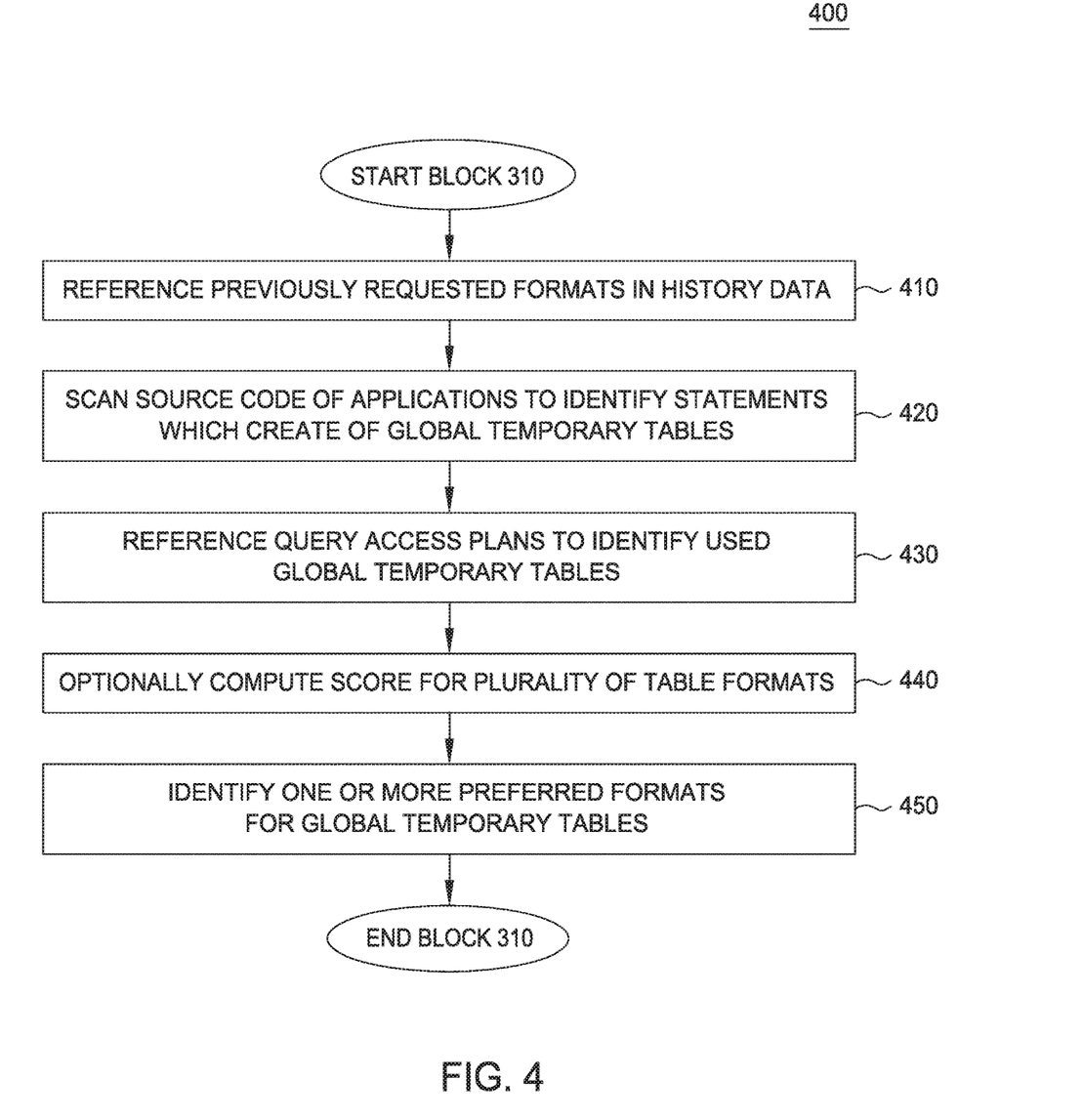
FIG. 4 is a flow chart illustrating a method to predict global temporary table formats, according to one embodiment.

FIG. 4 is a flow chart illustrating a method 400 corresponding to block 310 to predict global temporary table formats, according to one embodiment. As shown, the method 400 begins at block 410, where the GTT manager 103 references the history data 105 to identify GTT formats previously requested by the applications 106. At block 320, the GTT manager 103 may scan the source code of the applications 106 to identify statements which create (directly or indirectly) one or more GTTs, and identify the format of each GTT specified in each statement. At block 430, the GTT manager 103 may reference the history data 105 to identify query access plans that created one or more GTTs, and determine the format of each GTT. At block 440, the GTT manager 103 may optionally compute a respective score for each of a plurality of different GTT formats. The plurality of different GTT formats may include each GTT format identified at blocks 410-430, as well as other formats defined by the GTT manager 103. The GTT manager 103 may use any suitable algorithm to compute a score for each GTT format. Generally, the GTT manager 103 computes higher scores for GTT formats that have been used frequently in the past by applications 106 (as reflected by the history data 105), as well as those that are likely to be used by the applications 106 (e.g., based on the source code scanning). Similarly, the GTT manager 103 computes higher scores for GTT formats that can accommodate more of the requested formats in the history data 105 than GTT formats that cannot accommodate as many of the requested formats in the history data 105.

At block 450, the GTT manager 103 may identify one or more preferred formats for GTTs based on one or more of the determinations made at blocks 410-430 and the scores computed at block 440. Generally, in identifying preferred formats, the GTT manager 103 identifies the GTT formats that are generic enough to be re-used by as many applications 106 as possible, and/or reflect the most frequently requested GTT formats as reflected by the history data 105. The GTT manager 103 may store an indication of the preferred formats for future use.

As previously indicated, the GTT manager 103 may periodically execute the method 400 to refine the preferred formats based on the most recent data (e.g., the history data 105, source code of applications 106, and the like). Doing so allows the GTT manager 103 to ensure that the best set of GTT formats are used to create the GTTs in the pool of GTTs 104. For example, the GTT manager 103 may execute the method 400 hourly, daily, weekly, and the like.

Figure 5:
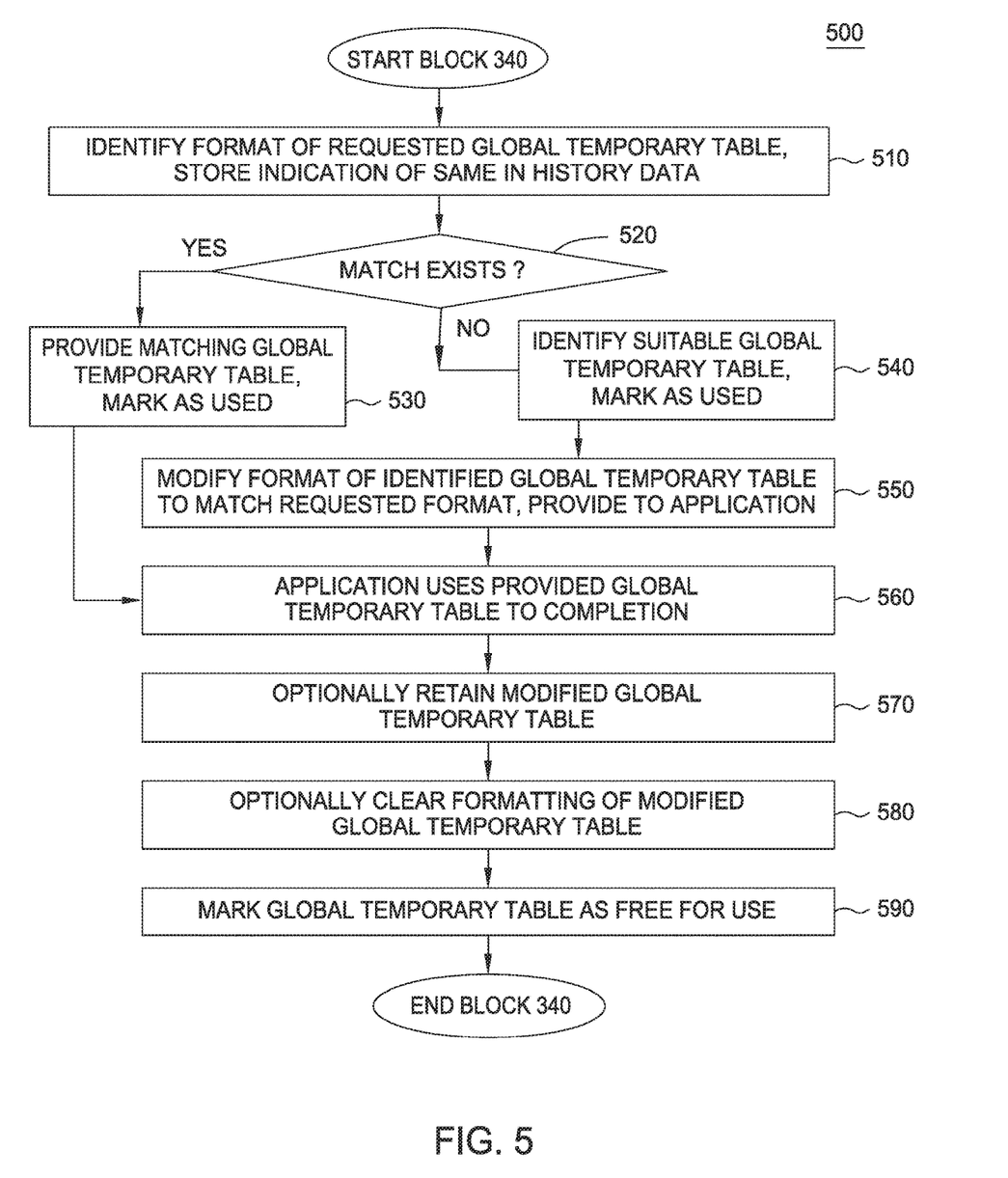
FIG. 5 is a flow chart illustrating a method to provide a global temporary table to an application from a pool of global temporary tables without creating the global temporary table, according to one embodiment.

FIG. 5 is a flow chart illustrating a method 500 corresponding to block 340 to provide a global temporary table to an application from a pool of global temporary tables without creating the global temporary table, according to one embodiment. As shown, the method 500 begins at block 510, where the GTT manager 103 identifies the format of the requested GTT, and stores an indication of the requested format in the history data 105. For example, the SQL statement may define a GTT with 3 columns of 20 characters each. Therefore, the GTT manager 103 may store an indication that one of the applications 106 requested a GTT having 3 columns of 20 characters each. The indication may also specify metadata describing the requesting application, such as an application name, type, etc.

At block 520, the GTT manager 103 may determine whether the pool of GTTs 104 includes a GTT that matches the format of the requested GTT. If a match exists, the method proceeds to block 530, where the GTT manager 103 provides the matching GTT to the application, and marks the provided GTT as being used. If a match does not exist, the GTT manager 103 proceeds to block 540. At block 540, the GTT manager 103 identifies a GTT in the pool of GTTs 104 that is suitable to accommodate the requested GTT format. For example, if a GTT has a single column of 100 characters, the GTT manager 103 may determine that the 3 columns of 20 characters can be casted to this column, and the GTT is therefore suitable to fulfill the request for the GTT. The GTT manager 103 may then mark the identified GTT as used.

At block 550, the GTT manager 103 may modify the format of the GTT identified at block 540 to match the format of the GTT requested by the application 106. As previously indicated, the GTT manager 103 may use any technique to modify the format of the GTT. For example, the GTT manager 103 may cast the requested column(s) to the column(s) of the identified GTT. As another example, the GTT manager 103 may build a view over the column(s) of the GTT and cast the requested GTT formats to the GTT. As yet another example, the GTT manager 103 may modify the internal mappings which define the GTT to match the requested format. Once the GTT manager 103 modifies the format of the GTT, the GTT manager 103 provides the modified GTT to the requesting application.

At block 560, the application uses the provided GTT to completion. In some embodiments, the application provides an indication to the GTT manager 103 that the GTT is no longer needed. At block 570, the GTT manager 103 may optionally retain the modified GTT. For example, if the GTT manager 103 determines that the same application will request the same GTT again, the GTT manager 103 may not remove the modified formatting, and retain the modified formatting for the next time the application requests the same GTT. At block 580, the GTT manager 103 optionally clears the modified formatting of the modified GTT. At block 590, the GTT manager 103 marks the GTT as free for use, allowing the GTT manager 103 to provide the GTT to applications requesting a GTT.

Figure 6:
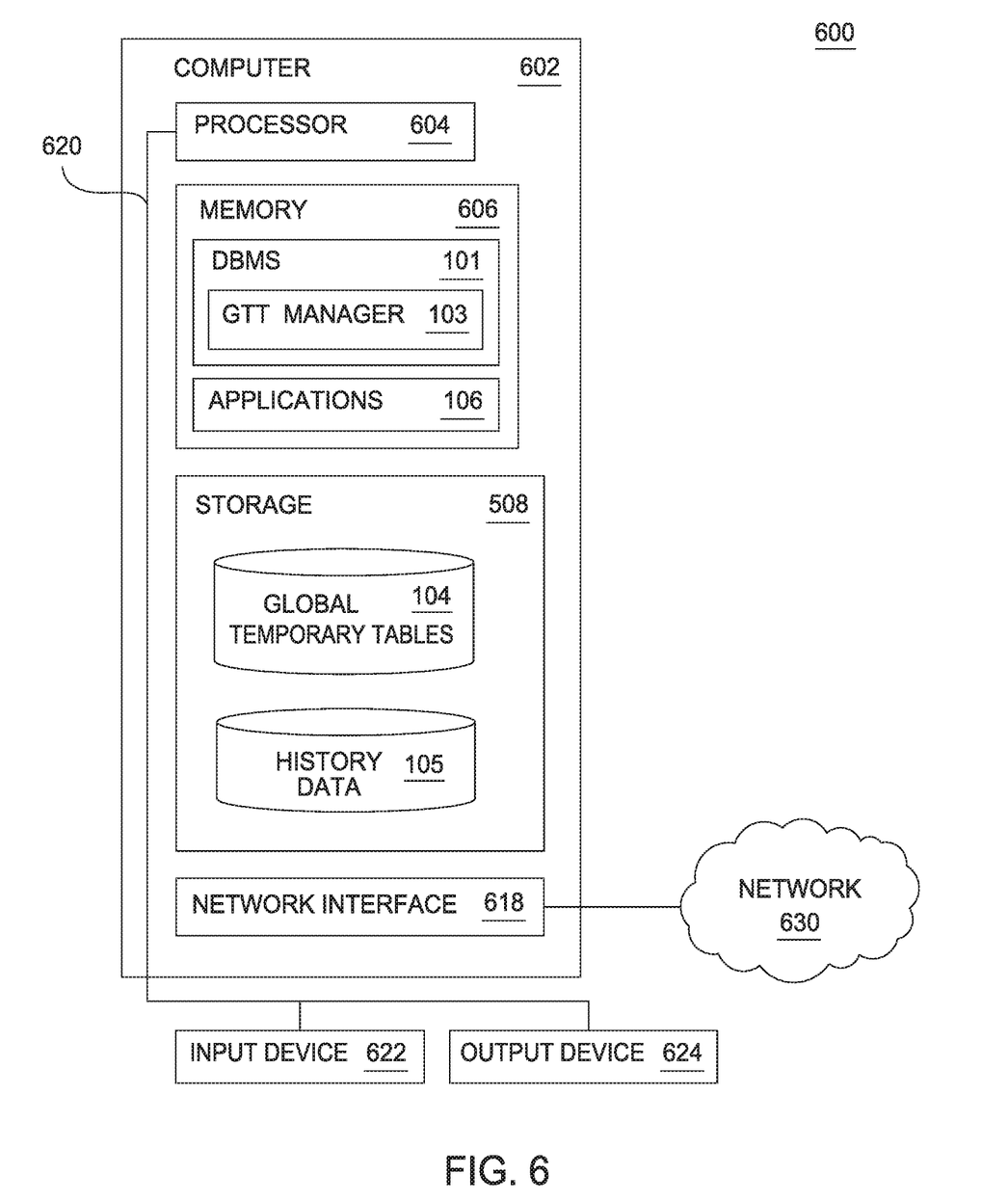
FIG. 6 is a block diagram illustrating a system which provides dynamic and predictive global temporary table formats, according to one embodiment.

FIG. 6 is a block diagram illustrating a system 600 which provides dynamic and predictive global temporary table formats, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the DBMS 101, the GTT manager 103, and the applications 106, each described in greater detail above. As shown, the storage 608 contains the GTTs 104 and the history data 105. Generally, the system 600 incorporates all methods, systems, apparatuses, and functionality described above with reference to FIGS. 1-5.

Advantageously, embodiments disclosed herein provide techniques to re-use global temporary tables, even if the global temporary tables have a format that does not match a format requested by an application. By modifying existing global temporary tables to match the requested format, a DBMS does not need to waste system resources used in creating a global temporary table each time one is requested by an application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the GTT manager 103 could execute on a computing system in the cloud and receive requests to create global temporary tables from applications. In such a case, the GTT manager 103 could re-use an existing global temporary table and store a metadata describing the requested GTT format at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for a database management system to support predictive global temporary tables, the computer-implemented method comprising:
   receiving, by the database management system and from a first application, a request specifying to generate a global temporary table of a desired format, the desired format comprising a plurality of desired fields including a desired field of a desired data type and of a desired data length;
   upon determining that a plurality of global temporary tables, stored by the database management system, does not include any global temporary table having the desired format, identifying a first global temporary table, of the plurality of global temporary tables, as having an existing format that is a closest match to the desired format in terms of fields, wherein the existing format comprises a plurality of existing fields including an existing field of an existing data type different from the desired data type and of an existing data length different from the desired data length;
   redefining the first global temporary table for reuse by the first application and absent any request specifying to redefine the first global temporary table, including casting at least part of the existing field from the existing data type and length to the desired data type and length by operation of one or more computer processors;
   providing the redefined global temporary table to the first application, whereafter the first application applies a plurality of database operations to the redefined global temporary table, wherein the plurality of database operations is based on a specified query language and includes at least two of a select operation, an insert operation, and an update operation; and
   subsequent to the first application indicating that the redefined global temporary table is no longer needed, further redefining the global temporary table for use by a second application different than the first application, thereby improving performance of the database management system by performing table redefinitions to avoid a processing overhead associated with temporary table creation for each of the first and second applications.

2. The computer-implemented method of claim 1, wherein redefining the first global temporary table further comprises building a database view format over the first global temporary table to cast the existing format into the desired format and modifying a set of internal mappings defining the existing format, wherein the modified set of internal mappings include a plurality of bits defining the desired format in the first global temporary table.

3. The computer-implemented method of claim 1, further comprising, prior to receiving the request:
   referencing a history data in order to identify at least one previous global temporary table requested by at least one application;
   referencing the history data in order to identify at least one previous global temporary table created as part of a query access plan; and
   scanning a source code of the at least one application in order to identify a plurality of statements specifying to create at least one global temporary table.

4. The computer-implemented method of claim 3, further comprising, subsequent to scanning the source code and prior to receiving the request:
   creating, by the database management system, the plurality of global temporary tables, each of the plurality of global temporary tables having a respective format, wherein the format of each of the plurality of global temporary tables is determined based on the history data and the plurality of statements in the source code; and
   storing an indication that each global temporary table is available for application use.

5. The computer-implemented method of claim 1, wherein the first application is of a first job, of a plurality of jobs, wherein each of the plurality of jobs comprise a plurality of applications, wherein each of the plurality of global temporary tables is available for use by each application of each job.

6. A system to provide support for predictive global temporary tables, the system comprising:
   one or more computer processors; and
   a memory containing a program comprising a database management system which, when executed by the one or more computer processors, performs an operation comprising:
     receiving, from a first application, a request specifying to generate a global temporary table of a desired format, the desired format comprising a plurality of desired fields including a desired field of a desired data type and of a desired data length;
     upon determining that a plurality of global temporary tables, stored by the database management system, does not include any global temporary table having the desired format, identifying a first global temporary table, of the plurality of global temporary tables, as having an existing format that is a closest match to the desired format in terms of fields, wherein the existing format comprises a plurality of existing fields including an existing field of an existing data type different from the desired data type and of an existing data length different from the desired data length;

redefining the first global temporary table for reuse by the first application and absent any request specifying to redefine the first global temporary table, including casting at least part of the existing field from the existing data type and length to the desired data type and length;

providing the redefined global temporary table to the first application, whereafter the first application applies a plurality of database operations to the redefined global temporary table, wherein the plurality of database operations is based on a specified query language and includes at least two of a select operation, an insert operation, and an update operation; and subsequent to the first application indicating that the redefined global temporary table is no longer needed, further redefining the global temporary table for use by a second application different than the first application, thereby improving performance of the database management system by performing table redefinitions to avoid a processing overhead associated with temporary table creation for each of the first and second applications.

7. The system of claim 6, wherein redefining the first global temporary table further comprises building a database view format over the first global temporary table to cast the existing format into the desired format and modifying a set of internal mappings defining the existing format, wherein the modified set of internal mappings include a plurality of bits defining the desired format in the first global temporary table.

8. The system of claim 6, the operation further comprising, prior to receiving the request:
referencing a history data in order to identify at least one previous global temporary table requested by at least one application;
referencing the history data in order to identify at least one previous global temporary table created as part of a query access plan; and
scanning a source code of the at least one application in order to identify a plurality of statements specifying to create at least one global temporary table.

9. The system of claim 8, the operation further comprising, subsequent to scanning the source code and prior to receiving the request:
creating, by the database management system, the plurality of global temporary tables, each of the plurality of global temporary tables having a respective format, wherein the format of each of the plurality of global temporary tables is determined based on the history data and the plurality of statements in the source code; and
storing an indication that each global temporary table is available for application use.

10. The system of claim 6, wherein the first application is of a first job, of a plurality of jobs, wherein each of the plurality of jobs comprise a plurality of applications, wherein each of the plurality of global temporary tables is available for use by each application of each job.

11. A computer program product to provide support for predictive global temporary tables, the computer program product comprising:
a computer-readable storage medium having computer-readable program code embodied therewith, the computer-readable program code executable by one or more computer processors to perform an operation comprising:

receiving, by a database management system and from a first application, a request specifying to generate a global temporary table of a desired format, the desired format comprising a plurality of desired fields including a desired field of a desired data type and of a desired data length;

upon determining that a plurality of global temporary tables, stored by the database management system, does not include any global temporary table having the desired format, identifying a first global temporary table, of the plurality of global temporary tables, as having an existing format that is a closest match to the desired format in terms of fields, wherein the existing format comprises a plurality of existing fields including an existing field of an existing data type different from the desired data type and of an existing data length different from the desired data length;

redefining the first global temporary table for reuse by the first application and absent any request specifying to redefine the first global temporary table, including casting at least part of the existing field from the existing data type and length to the desired data type and length;

providing the redefined global temporary table to the first application, whereafter the first application applies a plurality of database operations to the redefined global temporary table, wherein the plurality of database operations is based on a specified query language and includes at least two of a select operation, an insert operation, and an update operation; and subsequent to the first application indicating that the redefined global temporary table is no longer needed, further redefining the global temporary table for use by a second application different than the first application, thereby improving performance of the database management system by performing table redefinitions to avoid a processing overhead associated with temporary table creation for each of the first and second applications.

12. The computer program product of claim 11, wherein redefining the first global temporary table further comprises building a database view format over the first global temporary table to cast the existing format into the desired format and modifying a set of internal mappings defining the existing format, wherein the modified set of internal mappings include a plurality of bits defining the desired format in the first global temporary table.

13. The computer program product of claim 12, the operation further comprising, prior to receiving the request:
referencing a history data in order to identify at least one previous global temporary table requested by at least one application;
referencing the history data in order to identify at least one previous global temporary table created as part of a query access plan; and
scanning a source code of the at least one application in order to identify a plurality of statements specifying to create at least one global temporary table.

14. The computer program product of claim 13, the operation further comprising, subsequent to scanning the source code and prior to receiving the request:
creating, by the database management system, the plurality of global temporary tables, each of the plurality of global temporary tables having a respective format, wherein the format of each of the plurality of global temporary tables is determined based on the history data and the plurality of statements in the source code; and storing an indication that each global temporary table is available for use by one or more applications.

15. The computer program product of claim 11, wherein the first application is of a first job, of a plurality of jobs, wherein each of the plurality of jobs comprise a plurality of applications, wherein each of the plurality of global temporary tables is available for use by each application of each job.

16. The computer-implemented method of claim 1, wherein the first application indicates that the redefined global temporary table is no longer needed, only after the first application has applied the plurality of database operations to the modified global temporary table;
wherein redefining the first global temporary table further comprises:
building a database view format over the first global temporary table in order to cast the existing format into the desired format; and
modifying a set of internal mappings defining the existing format, wherein the modified set of internal mappings include a plurality of bits defining the desired format in the first global temporary table.

17. The computer-implemented method of claim 16, further comprising, prior to receiving the request:
referencing a history data in order to identify at least one previous global temporary table requested by at least one application;
referencing the history data in order to identify at least one previous global temporary table created as part of a query access plan; and
scanning a source code of the at least one application in order to identify a plurality of statements specifying to create at least one global temporary table.

18. The computer-implemented method of claim 17, further comprising, subsequent to scanning the source code and prior to receiving the request:
creating, by the database management system, the plurality of global temporary tables, each of the plurality of global temporary tables having a respective format, wherein the format of each of the plurality of global temporary tables is determined based on the history data and the plurality of statements in the source code; and storing an indication that each global temporary table is available for application use.

19. The computer-implemented method of claim 18, wherein the first application is of a first job, of a plurality of jobs, wherein each of the plurality of jobs comprise a plurality of applications, wherein each of the plurality of global temporary tables is available for use by each application of each job;
wherein the plurality of global temporary tables is, in a first instance, determined as not including any global temporary table having the desired format, wherein in a second instance and upon determining that the plurality of global temporary tables includes a given global temporary table having the desired format, providing the given global temporary table to the first application without redefining the given global table.

20. The computer-implemented method of claim 19, further comprising, in respective instances:
(i) upon the first application indicating that the redefined global temporary table is no longer needed, and further upon determining that a likelihood of the desired format of the first global temporary table being reused does not meet a predefined threshold, redefining the first global temporary table back to the existing format, whereafter an indication that the first global temporary table is available as a candidate for application reuse is stored; and
(ii) upon the first application indicating that the redefined global temporary table is no longer needed, and further upon determining that a likelihood of the desired format of the first global temporary table being reused meets the predefined threshold, refraining from redefining the first global temporary table back to the existing format, whereafter an indication that the first global temporary table is available as a candidate for application reuse is stored.

* * * * *